United States Patent
Kim

(10) Patent No.: US 10,051,230 B2
(45) Date of Patent: Aug. 14, 2018

(54) METHOD FOR CONNECTING AN EXTERNAL APPARATUS AND MULTIMEDIA REPLAYING APPARATUS USING THE SAME

(71) Applicant: Samsung Electronics Co., Ltd., Suwon-si, Gyeonggi-do (KR)

(72) Inventor: Kyung-min Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/628,713

(22) Filed: Feb. 23, 2015

(65) Prior Publication Data
US 2015/0172593 A1 Jun. 18, 2015

Related U.S. Application Data

(63) Continuation of application No. 12/098,598, filed on Apr. 7, 2008, now Pat. No. 8,989,373.

(30) Foreign Application Priority Data

Aug. 29, 2007 (KR) .................. 10-2007-0087148

(51) Int. Cl.
*H04N 5/765* (2006.01)
*G06F 1/16* (2006.01)
(Continued)

(52) U.S. Cl.
CPC ........... *H04N 5/765* (2013.01); *G06F 1/1698* (2013.01); *G11B 20/10* (2013.01); *G11B 27/102* (2013.01);
(Continued)

(58) Field of Classification Search
CPC .................... H04L 9/0662; H04L 9/0668
(Continued)

(56) References Cited

U.S. PATENT DOCUMENTS 5,544,240 A 8/1996 Warren
5,692,213 A 11/1997 Goldberg et al.
(Continued)

FOREIGN PATENT DOCUMENTS

CN 1681307 A 10/2005
CN 1956054 A 5/2007
(Continued)

OTHER PUBLICATIONS

Headset Profile, XP-002277008, Bluetooth Specification, version 1.1, Part K:6, Feb. 22, 2001, pp. 197-226.
(Continued)

*Primary Examiner* — Anthony Brown
(74) *Attorney, Agent, or Firm* — Jefferson IP Law, LLP

(57) ABSTRACT

A method for connecting an external apparatus and a multimedia replaying apparatus using the same. The method includes determining whether a command for displaying menus is input while multimedia content is replayed, determining a multimedia content replay state indicating whether a part or the whole of the multimedia contents is being replayed at an external apparatus if it is determined that the command for displaying menus is input, and displaying the menus comprising the multimedia content replay state on an area displaying a video of the multimedia contents. Therefore, a part or entire of replayed multimedia contents is readily transmitted to an external apparatus for wireless communication.

16 Claims, 8 Drawing Sheets

(51) Int. Cl.
  *G11B 20/10* (2006.01)
  *G11B 27/10* (2006.01)
  *H04N 21/41* (2011.01)
  *H04N 21/436* (2011.01)
  *H04N 21/4363* (2011.01)
  *H04N 21/442* (2011.01)
  *H04N 21/443* (2011.01)
  *G11B 27/34* (2006.01)
  *H04N 5/775* (2006.01)

(52) U.S. Cl.
  CPC ............ *G11B 27/34* (2013.01); *H04N 5/775* (2013.01); *H04N 21/4122* (2013.01); *H04N 21/43615* (2013.01); *H04N 21/43637* (2013.01); *H04N 21/4438* (2013.01); *H04N 21/44222* (2013.01)

(58) Field of Classification Search
  USPC .......................................................... 386/46
  See application file for complete search history.

(56) References Cited

U.S. PATENT DOCUMENTS

| | | | |
|---|---|---|---|
| 5,790,794 A | 8/1998 | Dulac et al. | |
| 5,896,388 A | 4/1999 | Earnest | |
| 5,995,139 A | 11/1999 | Lee | |
| 6,092,142 A | 7/2000 | Mehta et al. | |
| 6,226,785 B1 | 5/2001 | Peterson et al. | |
| 6,262,723 B1 | 7/2001 | Matsuzawa et al. | |
| 6,321,252 B1 | 11/2001 | Bhola et al. | |
| 6,408,128 B1 | 6/2002 | Abecassis | |
| 6,496,980 B1 | 12/2002 | Tillman et al. | |
| 6,501,902 B1 | 12/2002 | Wang | |
| 6,725,215 B2 | 4/2004 | Yamamoto | |
| 7,136,630 B2 | 11/2006 | Xie | |
| 7,242,924 B2 | 7/2007 | Xie | |
| 7,283,721 B2 | 10/2007 | Ostermann et al. | |
| 7,289,791 B2 | 10/2007 | Xie | |
| 7,430,360 B2 | 9/2008 | Abecassis | |
| 7,434,052 B1 | 10/2008 | Rump | |
| 7,480,441 B2 | 1/2009 | Klausberger et al. | |
| 7,577,466 B2 | 8/2009 | Kim | |
| 7,634,254 B2 | 12/2009 | Xie | |
| 7,930,758 B2 | 4/2011 | Cho et al. | |
| 8,020,140 B2 | 9/2011 | Ido et al. | |
| 8,166,093 B2 | 4/2012 | Gage | |
| 8,200,490 B2 | 6/2012 | Choi et al. | |
| 8,316,404 B2 | 11/2012 | Cho et al. | |
| 8,413,255 B2 | 4/2013 | Cho et al. | |
| 8,464,291 B2 | 6/2013 | Yamamoto | |
| 2001/0020958 A1 | 9/2001 | Yoo et al. | |
| 2002/0007368 A1 | 1/2002 | Lee et al. | |
| 2002/0049836 A1 | 4/2002 | Shibuya | |
| 2002/0052864 A1 | 5/2002 | Yamamoto | |
| 2002/0161780 A1 | 10/2002 | Dutta et al. | |
| 2005/0021507 A1 | 1/2005 | Yamamoto | |
| 2005/0076390 A1 | 4/2005 | Klausberger et al. | |
| 2005/0273609 A1* | 12/2005 | Eronen | H04L 63/0428 713/171 |
| 2006/0031513 A1 | 2/2006 | Ido et al. | |
| 2006/0121960 A1* | 6/2006 | Wang | H04M 1/6033 455/575.2 |
| 2006/0145756 A1 | 7/2006 | Lee et al. | |
| 2006/0280127 A1* | 12/2006 | Mizuno | H04L 12/281 370/254 |
| 2007/0002784 A1* | 1/2007 | Edwards | G08C 23/04 370/315 |
| 2007/0006266 A1 | 1/2007 | Yamamoto | |
| 2007/0087686 A1* | 4/2007 | Holm | H04S 7/30 455/3.06 |
| 2007/0250637 A1 | 10/2007 | Jiang | |
| 2007/0266411 A1 | 11/2007 | Yamamoto et al. | |
| 2008/0081558 A1* | 4/2008 | Dunko | G11B 27/002 455/41.1 |
| 2008/0288871 A1 | 11/2008 | Lee et al. | |
| 2009/0060456 A1 | 3/2009 | Kim | |
| 2010/0050081 A1 | 2/2010 | Lee et al. | |
| 2011/0161811 A1 | 6/2011 | Choi | |
| 2011/0167501 A1 | 7/2011 | Cho et al. | |
| 2011/0202645 A1 | 8/2011 | Abdelal et al. | |
| 2011/0314174 A1 | 12/2011 | Joung et al. | |
| 2012/0101607 A1 | 4/2012 | Gage | |

FOREIGN PATENT DOCUMENTS

| | | |
|---|---|---|
| JP | 2004-007639 A | 1/2004 |
| JP | 2006-004292 A | 1/2006 |
| KR | 10-0508602 B1 | 8/2005 |
| KR | 10-2005-0096239 A | 10/2005 |
| KR | 10-2007-0066203 A | 6/2007 |

OTHER PUBLICATIONS

Nokia 9500 COmmunication User Guide, Internet Citation, XP-001556164, 2004.

IPhone User's Guide, APPLE, XP-002474183, Internet Citation, Jun. 2007.

* cited by examiner

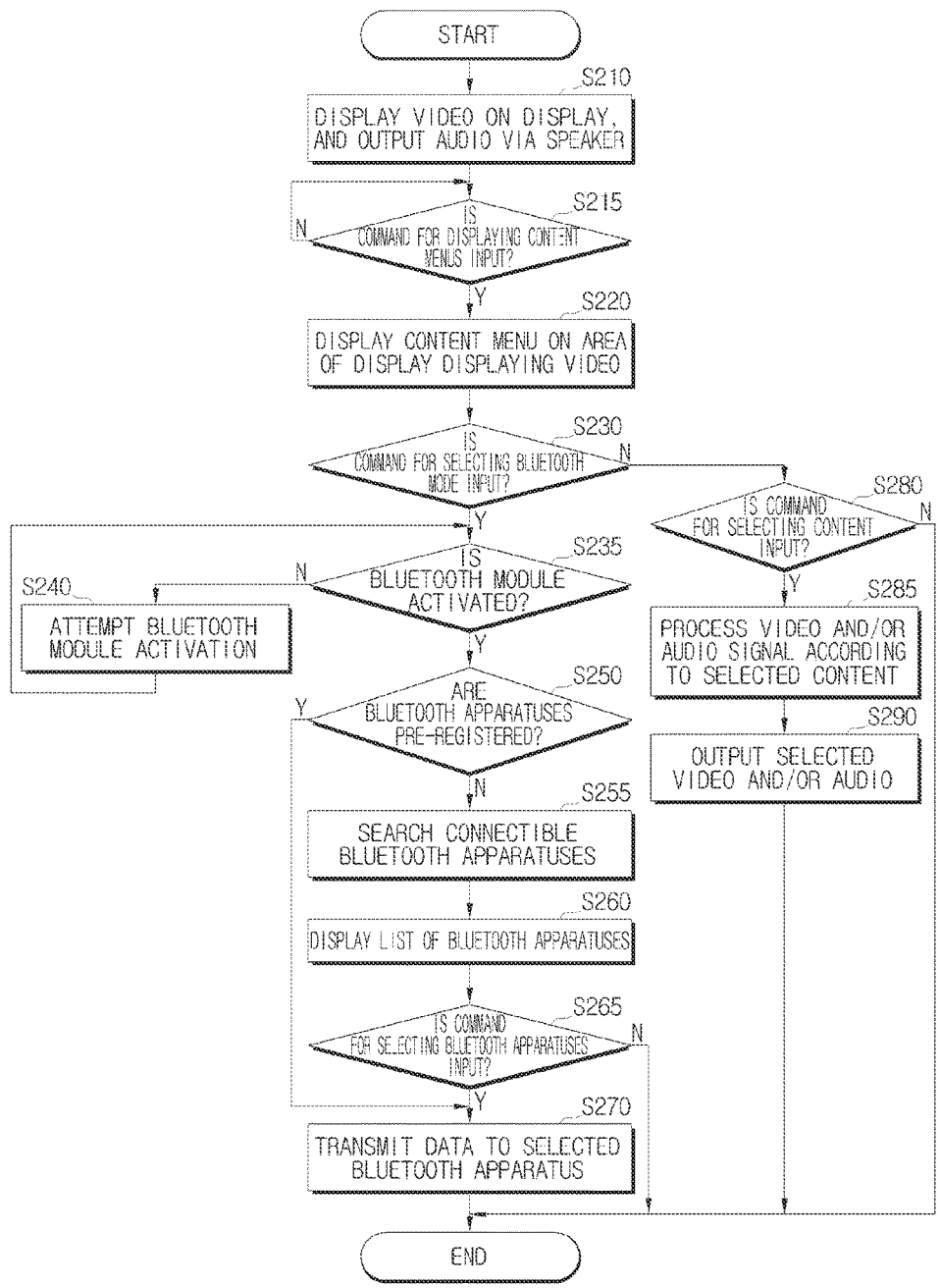

METHOD FOR CONNECTING AN EXTERNAL APPARATUS AND MULTIMEDIA REPLAYING APPARATUS USING THE SAME

CROSS-REFERENCE TO RELATED APPLICATIONS

This application is a continuation application of a prior application Ser. No. 12/098,598, filed on Apr. 7, 2008, which claimed the benefit under 35 U.S.C. § 119(a) of a Korean Patent Application filed on Aug. 29, 2007 in the Korean Intellectual Property Office and assigned Serial number 10-2007-0087148, the entire disclosure of which is hereby incorporated by reference.

BACKGROUND OF THE INVENTION

1. Field of the Invention

Aspects of the present invention relate to a method for connecting an external apparatus and a multimedia replaying apparatus, and more particularly, to a method for transmitting data to an external apparatus using wireless communication and a multimedia replaying apparatus using the same.

2. Description of the Related Art

An MPEG layer 3 (MP3) player is an example of a digital audio replaying apparatus that stores content, such as music and language learning systems, in a memory, and enables a user to selectively listen to the content without using a tape or a compact disc (CD). When the stored information is replayed, the MP3 player provides the user with good quality sound similar to that of CDs.

The MP3 player displays a current operation state through a display panel, and a user can easily determine the current operation state through the display panel. The MP3 player displays various information related to the currently replayed audio file through the display panel so that the user can easily determine information about the currently replayed audio file.

Recently, MP3 players offer the user with various functions, such as audio or video replay. The MP3 player has various communication modules, such as a Bluetooth module. The MP3 player is wirelessly connected with a headset so that the function of the MP3 player has been extended to replaying multimedia content, and is capable of transmitting the audio to the audio headset.

If the user desires to listen to an audio through a wireless headset while enjoying video and audio using the MP3 player, the user should stop replaying the video and audio, and convert the replay mode to a communication mode. Therefore, if the user desires to watch the video and audio of the multimedia content, the user experiences inconvenience of having to operate the MP3 player in order to replay the audio/video file all over again.

SUMMARY OF THE INVENTION

Aspects of the present invention relate to a digital multimedia replaying apparatus that transmits video or audio replayed by communication with an external apparatus to the external apparatus, and a control method thereof.

According to an aspect of the present invention, a control method of a multimedia replaying apparatus is provided. The method comprises determining whether a command to display a menu is input while multimedia content is replayed; determining a multimedia contents replay state indicating whether a part or the whole of the multimedia content is being replayed at an external apparatus if the command to display the menu is input; and displaying the menu comprising the multimedia contents replay state on a display of a multimedia replay apparatus, the multimedia replay state being selectable between a state of using the apparatus and a state of not replaying through the apparatus.

According to another aspect of the present invention, the multimedia replaying apparatus is able to function in a basic mode in which the whole of the multimedia content is replayed at the multimedia replaying apparatus, and a communication mode in which the part or the whole of the multimedia contents is replayed at the external apparatus.

According to another aspect of the invention, the displaying comprises displaying the communication mode on the menu if the multimedia replaying apparatus is operating in the basic mode, and the displaying comprises displaying the basic mode on the menu if the multimedia replaying apparatus is operating in the communication mode.

According to another aspect of the invention, if the communication mode is selected, the method further comprises generating a packet comprising at least one of the video or audio of the multimedia content; and transmitting the generated packet to the external apparatus.

According to another aspect of the invention, the generating comprises generating the packet to include at least one of un-replayed video or un-replayed audio of the multimedia contents.

According to another aspect of the invention, the packet is for wireless communication.

According to another aspect of the invention, if the communication mode is selected, the packet may be transmitted to an external apparatus which is pre-registered at the multimedia apparatus.

According to another aspect of the invention, if the communication mode is selected, and it is impossible for the packet to be transmitted to the external apparatus pre-registered at the multimedia replaying apparatus, the method may further comprise replaying the multimedia content using the multimedia replaying apparatus.

According to another aspect of the invention, if the communication mode is selected, and an external apparatus is not pre-registered at the multimedia replaying apparatus, the method further comprises searching for external apparatuses connectable with the multimedia replaying apparatus.

According to another aspect of the invention, the method further comprises displaying a list of the external apparatuses found by the search.

According to another aspect of the invention, the method further comprises registering information of the selected external apparatus if a command to select an external apparatus from the list of the searched external apparatuses is input, and wherein the transmitting comprises transmitting the packet to the selected external apparatus.

According to another aspect of the invention, a video corresponding to the audio is displayed through the multimedia replaying apparatus if the audio is transmitted to the external apparatus.

According to another aspect of the invention, the method further comprises replaying the video and audio comprised in the multimedia content by the multimedia replaying apparatus if the basic mode is selected.

According to another aspect of the invention, the multimedia content comprises at least one of an audio content and a video content.

According to another aspect of the present invention, a multimedia replaying apparatus is provided. The multimedia replaying apparatus comprising a display to display a video;

and a controller to determine whether a command to display a menu is input while the video is displayed, to determine a multimedia content replay state indicating whether a part or the whole of multimedia content including the video is replayed at an external apparatus, and to control the display to display menu including the multimedia content replay state on an area of the display, the multimedia replay state being selectable between a state of using the apparatus and a state of not replaying through the apparatus.

According to another aspect of the invention, the apparatus is operable in a basic mode in which the whole of the multimedia content is replayed at the multimedia apparatus; and a communication mode in which a part or the whole of the multimedia contents is replayed at the external apparatus.

According to another aspect of the invention, the controller displays the communication mode on the menu if the multimedia replaying apparatus is in the basic mode, and, the controller displays the basic mode on the menu if the multimedia replaying apparatus is in the communication mode.

According to another aspect of the invention, the apparatus further comprises an interface to generate a wirelessly transmittable packet and to transmit the generated packet to the external apparatus, wherein if the communication mode is selected, the controller generates a packet including at least one of the video or audio of the multimedia contents, and controls the interface to transmit the generated packet to the external apparatus.

According to another aspect of the invention, the interface may generates the packet to include at least one of un-replayed video or un-replayed audio of the multimedia contents.

According to another aspect of the invention, the interface may transmit the packet to an external apparatus that is pre-registered at the multimedia apparatus if the communication mode is selected.

According to another aspect of the invention, if the communication mode is selected, and an external apparatus is not pre-registered at the multimedia replaying apparatus, the interface may search for external apparatuses connectable with the multimedia replaying apparatus.

According to another aspect of the invention, the display displays a list of the external apparatuses found by the search.

According to another aspect of the invention, if a command to select an external apparatus from the list of the searched external apparatuses is input, the controller registers information of the selected external apparatus, and the interface transmits the packet to the selected external apparatus.

According to another aspect of the invention, if the interface transmits the audio in the packet to the external apparatus, the display displays a video corresponding to the audio in the packet.

According to another aspect of the invention, if the basic mode is selected, the controller controls the multimedia replaying apparatus to replay the video and audio included in the multimedia content through the multimedia replaying apparatus.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2 is a flow chart to explain a process of operating an MP3 player in a basic mode and a Bluetooth mode according to an embodiment of the present invention;

DETAILED DESCRIPTION OF THE EMBODIMENTS

Figure 1:
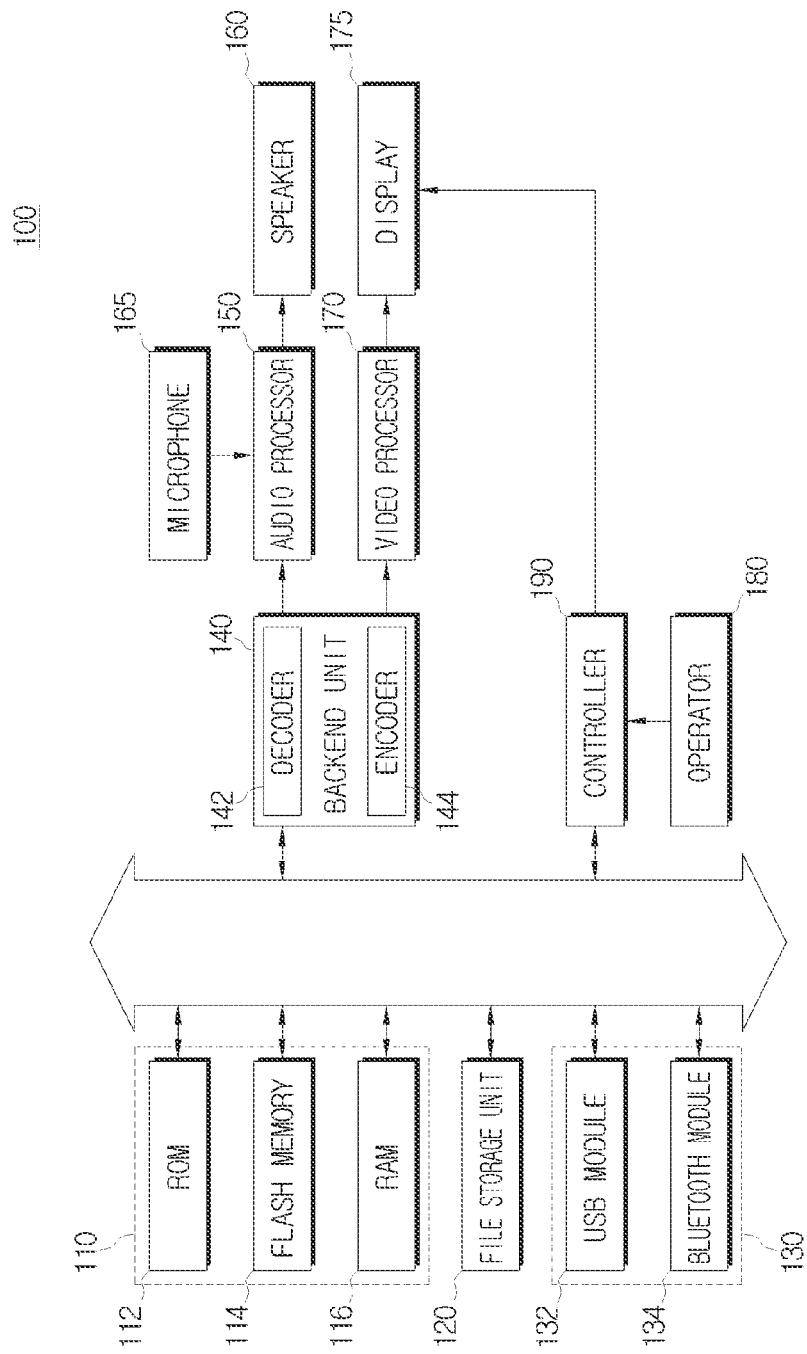
FIG. 1 is a block diagram illustrating an MP3 player of a type of digital multimedia replay apparatuses according to an aspect of the present invention.

Reference will now be made in detail to the present embodiments of the present invention, examples of which are illustrated in the accompanying drawings, wherein like reference numerals refer to the like elements throughout. The embodiments are described below, in order to explain the present invention by referring to the figures.

FIG. 1 is shows an MP3 player 100 as an example of a digital multimedia replay apparatus according to an embodiment of the present invention. The MP3 player 100 includes a storage unit 110, a file storage unit 120, an interface 130, a back-end unit 140, an audio processor 150, a speaker 160, a microphone 165, a video processor 170, a display 175, an operator 180, and a controller 190. According to other aspects of the invention, the MP3 player 100 may include additional and/or different components. Similarly, the functionality of two or more of the above units may be integrated into a single component. The MP3 player 100 is just an example of a digital multimedia replay apparatus that may be employed with aspects of the present invention.

The storage unit 110 stores program information, content information, and icon information required to control the MP3 player 100. The storage unit 110 shown in FIG. 1 comprises a read only memory (ROM) 112, a flash memory 114, and a random access memory (RAM) 116, but is not restricted thereto.

The ROM 112 stores information that should not be deleted even when the power turns off, such as information about the MP3 player 100, or icon information, or program information related with the icon. The flash memory 114 stores programs to control the back-end unit 140, and may also store updateable backup data. For example, the flash memory 114 may store information of peripheral Bluetooth apparatuses.

The RAM 116 is a storage unit used to temporarily back up various data, and operates as a working memory of the controller 190. The data stored in the ROM 112 and flash memory 114 remain in the memory even while the power is switched off, but the data stored in the RAM 116 is lost if the power is switched off.

The file storage unit 120 stores compressed multimedia content in file format output from the back-end unit 140. The files stored in the file storage unit 120 are in a compressed form, and may include a still image file, a moving image file, and an audio file. The files are stored in an MPEG layer 3

(MP3) format. The file storage unit 120 may be embodied using ROM and RAM. Content may be stored in additional file formats, including other compressed file formats (like MP3) or uncompressed file formats.

The communication interface 130 performs data communication with the MP3 player 100. As shown in FIG. 1, the communication interface 130 includes a universal bus interface (USB) module 132 and a Bluetooth module 134, as shown in FIG. 1. The USB module 132 transmits and receives cable signals of data input/output to/from a USB apparatus such as PC and USB memory. The Bluetooth module 134 converts data to a transmittable wireless signal under the control of the controller 190, and transmits the signal to a pre-registered peripheral Bluetooth apparatus, such as a stereo headset. The Bluetooth module 134 searches connectable peripheral Bluetooth apparatuses, and transmits the searched result to the controller 190 under the control of the controller 190. Other communication standards, such as Firewire (IEEE 1394), WiBro, or Wi-Fi, may also be employed in addition to, or instead of, the modules 132 and 134.

The back-end unit 140 processes a video and/or audio signal (multimedia content), through compression, extension, or replay. The back-end unit 140 comprises a decoder 142 and an encoder 144. The decoder 142 decompresses the files input from the file storage 120, transmits audio to the audio processor 150, and transmits video to the video processor 170. The encoder 144 compresses the video and audio input from the USB module 132 in a predetermined format, and transmits the compressed files to the file storage unit 120. The encoder 144 may compress the audio input from the audio processor 150 in a predetermined format, and transmit compressed video and audio to the file storage unit 120. According to other aspects of the invention, one or more of the encoder 144 or decoder 142 need not used, such as when the files are not compressed or are loaded directly to the file storage unit 120 in a compressed format.

The audio processor 150 converts an analog audio signal input through audio input elements, such as the microphone 165, into a digital audio signal, and transmits the converted signal to the back-end unit 140. The audio processor 150 converts the digital audio signal output from the back-end unit 140 into an analog audio signal, and outputs the converted signal through the speaker 160. The microphone 165 is one example of an audio input element; other audio input elements may also be employed. For example, the audio may be input via the communication interface 130 instead of, or in addition to, the microphone 165.

The video processor 170 processes the video signal input from the back-end unit 140, and outputs the processed signal to the display 175. The display 175 is a type of display element that displays the video, text, and icon output from the video processor 170 or the controller 190.

The operator 180 receives an operation command from a user, and transmits the command to the controller 190. The operator 180 may include keys and/or a click wheel formed as a single body with the MP3 player 100. The operator 180 may also be embodied as a graphical user interface (GUI) which enables a user to input a command through a menu screen displayed on the display 175. However, the operator 180 is not limited to the above examples.

The controller 190 controls the overall operations of the MP3 player 100. If the user's command is input through the operator 180, the controller 190 controls function blocks of the MP3 player 100 to respond to the command. For example, if the user inputs a command for replaying a file stored in the file storage unit 120, the controller 190 retrieves the file stored in the file storage unit 120, and transmits the retrieved file to the back-end unit 140. The back-end unit 140 decodes the file, the audio processor 150 processes the audio, and the video processor 170 processes the video. Thereafter, the controller 190 controls the back-end unit 140, the audio processor 150, the video processor 170, the speaker 160, and the display 175 to output the audio through the speaker 160, and to output the video through the display 175.

If the user inputs a command to output audio to a peripheral Bluetooth apparatus (not shown), the controller 190 retrieves the audio stored in the storage unit 110, and transmits the retrieved audio to the Bluetooth module 134. The controller 190 controls the Bluetooth module 134 so that the MP3 format data is changed into a Bluetooth format packet, and the changed packet is transmitted to the peripheral Bluetooth apparatus.

The MP3 player 100 may operate in a basic mode and a Bluetooth mode. In the basic mode, the data is received through the USB module 132, and the received data is stored in the file storage unit 120, or the MP3 player 100 replays the data stored in the file storage unit 120 independently. "Replays the data independently" indicates that if the replayed data is audio, the data is signal-processed, and the processed data signal is output through a speaker housed in the MP3 player 100 or through an earphone connected with the MP3 player 100 over a wire, and if the replayed data is video, the data is signal-processed, and the processed data signal is displayed on the display 175 on the MP3 player 100. On the other hand, in the Bluetooth mode, a part or the whole of MP3 data stored in the file storage unit 120 is replayed through the peripheral Bluetooth apparatus.

The controller 190 generates information generated in the process of converting the basic mode into the Bluetooth mode or the process of converting the Bluetooth mode into the basic mode, and displays the generated information on an area of the display 175. When the controller 190 displays the information on the display 175, the information may be displayed in on-screen display (OSD) manner or popup window manner.

FIG. 2 shows a process of operating the MP3 player 100 in a basic mode and a Bluetooth mode according to an embodiment of the present invention. If a user inputs a command for replaying a file (multimedia content), the multimedia content is replayed, during which a video component of the multimedia content is displayed on the display 175, and an audio component of the multimedia content is output via the speaker 160 in operation S210. If the user inputs a command to replay a file stored in the file storage unit 120 using the operator 180, the controller 190 retrieves the file from the file storage unit 120, and transmits the retrieved file to the backend unit 140. The decoder 142 in the backend unit 140 decodes the file. The audio selected from among the decoded file is converted into an analog audio signal at the audio processor 150, and the converted audio signal is output via the speaker 160. The decoded video is signal-processed at the video processor 170, and the processed video signal is displayed on the display 175.

The controller 190 determines whether a command for displaying content menus is input in operation S215. A user may select a content menu key provided on the MP3 player while viewing the file being replayed. The controller 190 determines that the command for displaying the content menu is input.

If the command for displaying the content menu is input in operation S215-Y, the controller 190 displays the content menu on an area of the display 175 in operation S220. The controller 190 generates the content menu using the content information stored in the ROM 112, and controls the display 175 to display the generated content menu on the area of the display 175 displaying the video in a popup window. The controller 190 controls various function blocks in order to pause replaying of the file. Accordingly, while the content menus are displayed on the display 175, video or audio is not output through the display 175 and the speaker 160.

The content menus represent the contents of the replayed file. The content menus are displayed on an area of the replayed video while the file replaying pauses. If content is selected from the content menus, remaining parts of the file are replayed corresponding to the selected content. Function menus of the MP3 player 100, such as a main menu, are configured in a manner that requires a user to first terminate replaying the file before selecting an item from, and then start replaying the file from the beginning. Therefore, the content menu is distinct from the main menu, in that the content menu is activated while the video is displayed. Moreover, while pausing can be done while the content menu is displayed, according to other aspects of the invention, the content can continue being played while the content menu is shown.

The content menu may comprise a file replay state. The file replay state indicates whether the MP3 player replays the file, or the external apparatus replays a part or the whole of the file. The file replay state includes the basic mode and Bluetooth mode described above. The file replay state may also include information regarding the basic mode and Bluetooth mode on the display.

The controller 190 determines whether a command for selecting the Bluetooth mode is input in operation S230. If content menus are displayed on an area of the display 175 displaying a video, a user may select the Bluetooth mode from the content menus. The controller 190 determines that the Bluetooth mode is selected.

If the command for selecting the Bluetooth mode is input in operation S230-Y, the controller 190 determines whether the Bluetooth module 134 is activated in operation S235. To reduce waste of power, the Bluetooth module 134 may be activated to communicate with the peripheral Bluetooth apparatuses after the Bluetooth mode is selected. If the Bluetooth module 134 is not activated in operation S235-N, the controller 190 outputs a control signal to activate the Bluetooth module 134 to the Bluetooth module 134. In operation S240, the Bluetooth module 134 attempts to activate. According to other aspects of the invention, operations S235 and S240 may be omitted, such as when the Bluetooth module 134 is always active.

If the Bluetooth module 134 is activated in operation S235-Y, the controller 190 determines whether the peripheral Bluetooth apparatuses are pre-registered in the flash memory 114 in operation S250. If the user stores information regarding a Bluetooth apparatus beforehand to communicate with the Bluetooth apparatus via Bluetooth, or the user has ever communicated with a Bluetooth apparatus before, the controller 190 may automatically store the information of the Bluetooth apparatus in the flash memory 114. Accordingly, the controller 190 may determine whether the information about the Bluetooth apparatus is stored in the flash memory 114.

If the information of the Bluetooth apparatus is not registered in operation S250-N, the controller 190 controls the Bluetooth module 134 to search for connectable Bluetooth apparatuses in operation S255. The Bluetooth module 134 searches for Bluetooth apparatuses capable of Bluetooth communication within a predetermined distance, and transmits the search results to the controller 190. The controller 190 generates a list of the available Bluetooth apparatuses using the search results transmitted from the Bluetooth module 134, and controls the display 175 to display the generated list on the display 175 in operation S260.

The controller 190 determines whether a command to select one of the Bluetooth apparatuses is input in operation S265. The user may select a desired Bluetooth apparatus with reference to the list of the available Bluetooth apparatuses on the display 175. For example, in operation S265-Y, if the user selects a headset from the list of available Bluetooth apparatuses, the controller 190 registers information of the selected Bluetooth apparatus, that is, information of the headset, in the flash memory 114. If no apparatus is selected, the process may terminate at operation S265-N.

If the Bluetooth apparatus is preregistered in operation S-250-Y or the command to select the apparatus is received in operation S265-Y, the controller 190 controls the Bluetooth module 134 to transmit data to the selected Bluetooth apparatus in operation S270. If the selected Bluetooth apparatus is a headset that only processes audio, the Bluetooth module 134 retrieves the audio from the file storage unit 120, generates a packet compliant with the Bluetooth standard, and transmits the generated packet to the headset. The video is replayed in the above manner. The audio is transmitted to the headset, and replayed through the headset. The video is replayed on the MP3 player 100. Although the Bluetooth mode is selected, the video and audio are continuously replayed. User convenience is thus improved.

The controller 190 determines that the command for selecting the Bluetooth mode is not input in operation S230-N, and also determines whether a command to select content is input at operation S280. The content menus comprise various content items including the Bluetooth mode. The user may select, for example, an item "Street Size" from the content items.

If the command to select content is input in operation S285-Y, the controller 190 processes the video and audio signals according to the selected content at operation S285. The processed video and audio signals are output at operation S290. For example, if the user selects an item "Street Size" from the content items, the video processor 170 processes and outputs the signal, in a manner of scaling the video to a larger size. If no selection is made, the process terminates at operation S280-N.

While a process of converting the basic mode into the Bluetooth mode according to an embodiment of the present invention has been disclosed, this disclosure should not be considered limiting. The Bluetooth mode may be converted into the basic mode. If the user selects the basic mode from the menus, the MP3 player 100 replays the video and audio following the selected part of the video and audio.

Figure 3A:
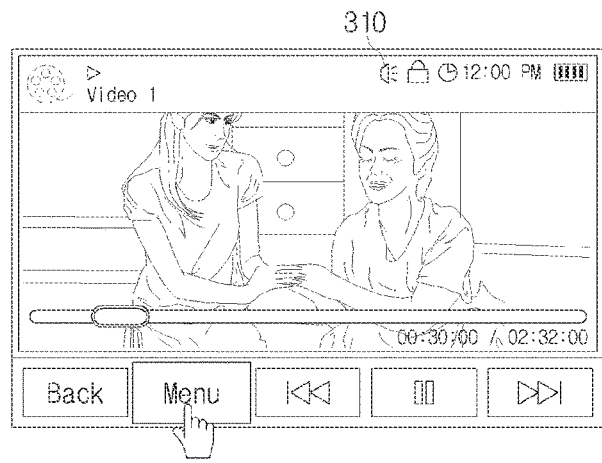
FIGS. 3A, 3B, 3C, 3D, 3E, 3F, and 3G are views illustrating a pop-up window provided by an MP3 player in the process of converting a basic mode to a Bluetooth mode.

A popup window provided by the MP3 player in the process of converting the basic mode into the Bluetooth mode will be explained with reference to FIGS. 3A to 3G. FIGS. 3A to 3G show a pop-up window provided by the MP3 player 100 in the process of converting a basic mode to a Bluetooth mode. As shown in FIG. 3A, a user is watching a file being replayed. A video component of the file is displayed on the display 175, and an audio component is output through the speaker 160. An icon 310 shown in FIG. 3A indicates that the audio component is output through the speaker 160. The user may select menu buttons while the file is replayed. The menu buttons are content menu buttons that are capable of activating while the video is replayed. As shown, the buttons include a back button, a menu button, a reverse button, a pause button, and a fast forward button.

According to other aspects of the invention, the buttons need not always be displayed, or may be selectively hidden, for example based on a current operation state.

Figure 3B:
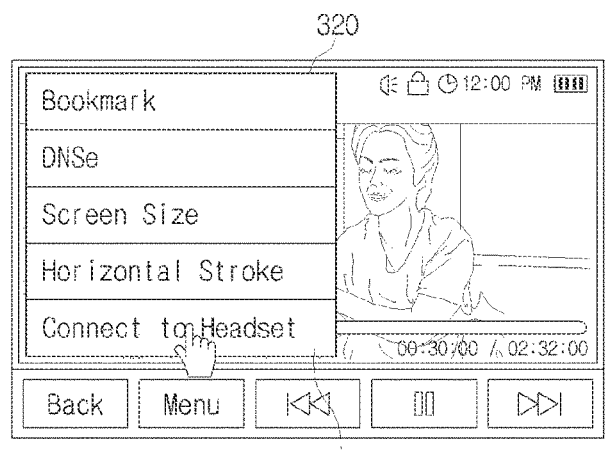

If the user selects the menu button, the controller 190 determines a file replay state. Menus 320, including the file replay state, are displayed on an area of the display 175 displaying a video being replayed. The file replay state is display information 325 indicating the Bluetooth mode among the menus 320. As shown, the menu 320 includes a bookmark, a DNSe processing, screen size, horizontal stroke, and a Bluetooth mode (i.e. connect to headset display information 325.) The user may select the Bluetooth mode by selecting the display information 325. If the MP3 player 100 is able to operate in the basic mode and the Bluetooth mode as described above, and a peripheral Bluetooth mode is limited to the wireless headset, the Bluetooth mode may be represented as "Connect to Headset" as shown in FIG. 3B for user convenience.

Figure 3C:
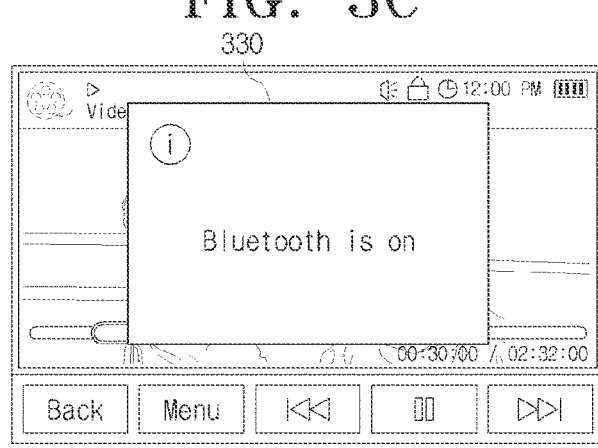
Figure 3D:
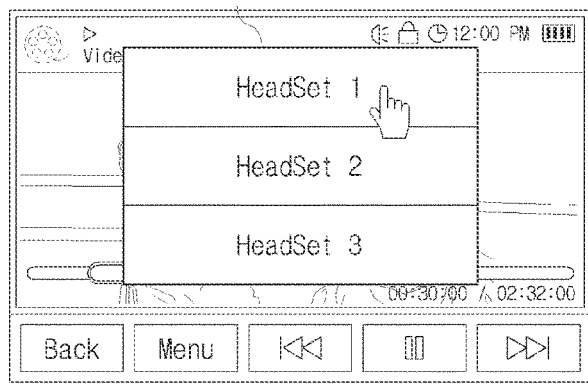

If the user selects the Bluetooth mode, the controller 190 determines whether the Bluetooth module 134 is activated. If the Bluetooth module 134 is not activated, the controller 190 activates the Bluetooth module 134. The controller 190 generates display information 330 "Bluetooth is on" to represent that the Bluetooth module 134 is currently being activated, and controls the display 175 to display the display information 330 on an area of the display 175 in a popup window. The display 175 displays the display information 330 "Bluetooth is on" as shown in FIG. 3C. However, the connection can be otherwise provided outside of a pop-up window, such as through an icon change at a periphery of the display.

If the controller 190 receives a result from the Bluetooth module 134 indicating that the activation is completed, the controller 190 determines whether information regarding peripheral Bluetooth apparatuses is pre-registered in the storage unit 110. If the information regarding the peripheral Bluetooth apparatuses does not exist, the controller 190 outputs to the Bluetooth module 134 a control signal to direct the Bluetooth module 134 to search for the connectable peripheral Bluetooth apparatuses. When the Bluetooth module 134 transmits the search results to the controller 190, the controller 190 generates a list of the connectable peripheral Bluetooth apparatuses, and transmits the generated list to the display 175. The display 175 displays a peripheral Bluetooth apparatus list 340 shown in FIG. 3D in a popup window.

Figure 3E:
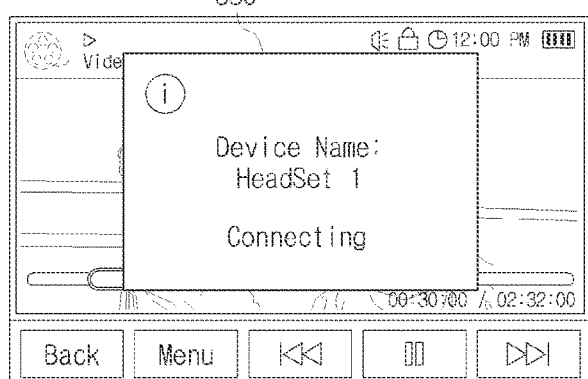

If the user selects a Bluetooth apparatus "Headset 1" from the peripheral Bluetooth apparatus list, the controller 190 stores the information of the Bluetooth apparatus "Headset 1" in the storage unit 110, and controls the Bluetooth module 134 to communicate with the Bluetooth apparatus "Headset 1". The controller 190 generates display information 350 "Device Name: Headset 1 Connecting" indicating that the Bluetooth module 134 is attempting a connection with the Bluetooth apparatus "Headset 1", and transmits the display information 350 to the display 175. The display 175 displays the display information 350 "Device Name: Headset 1 Connecting" in a popup window as shown in FIG. 3E. If necessary, the process of inputting a PIN code may be first performed in order to start communication between the Bluetooth module 134 and the Bluetooth apparatus "Headset 1."

Figure 3F:
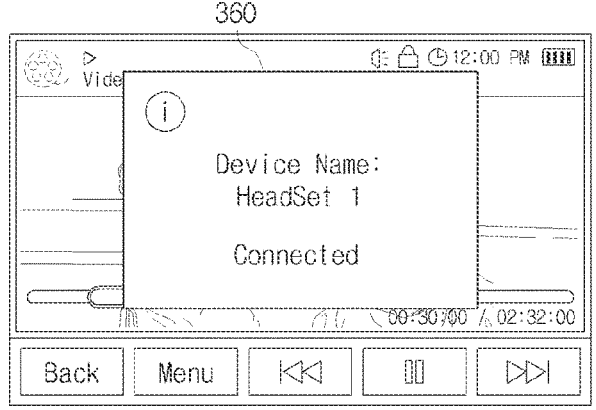

If the controller 190 receives from the Bluetooth module 134 a result indicating that the communication between the Bluetooth module 134 and the Bluetooth apparatus "Headset 1" is completed, the controller 190 generates display information 360 "Device Name: Headset 1 Connected" which indicates that the Bluetooth module 134 is completely connected with the Bluetooth apparatus "Headset 1" so that the Bluetooth module 134 is capable of communicating with the Bluetooth apparatus "Headset 1", and transmits the generated display information 360 to the display 175. The display 175 displays the display information 360 "Device Name: Headset 1 Connected" in a popup window as shown in FIG. 3F.

The controller 190 transmits the audio of the file to the Bluetooth apparatus "Headset 1", and transmits the video of the file to the MP3 player 100 to replay the audio and video. If the audio and video of the file stored in the file storage unit 120 are stored separately, the controller 190 retrieves the audio and video from the file storage unit 120, outputs the retrieved audio to the Bluetooth module 134, and outputs the retrieved video to the decoder 142. The Bluetooth module 134 generates a Bluetooth packet comprising the audio, and transmits the generated Bluetooth packet to the Bluetooth apparatus "Headset 1." The Bluetooth apparatus "Headset 1" decompresses the audio, and outputs the decompressed audio as an audible signal. The video is decompressed through the decoder 142, signal-processed at the video processor 170, and displayed on the display 175.

Figure 3G:
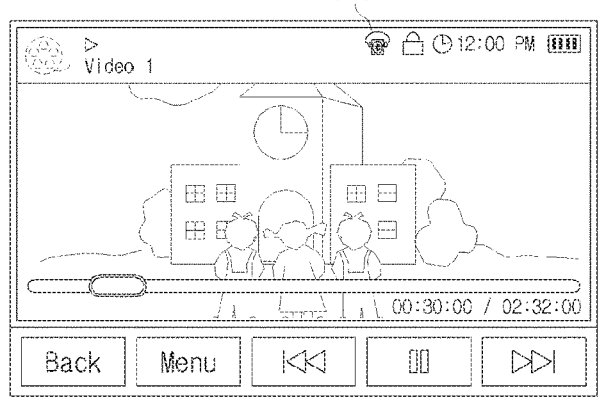

If both the video and the audio are associated with one file, the controller 190 retrieves the file from the file storage unit 120 and transmits the retrieved file to the back-end unit 140. The back-end unit 140 decompresses the file, transmits the audio of the file to the Bluetooth module 134, and transmits the video of the file to the video processor 170. The video is displayed on the display 175, and the audio is output through the Bluetooth apparatus "Headset 1." FIG. 3G shows a display displaying an icon 370 indicating that the video is continuously displayed on the display, and the audio is output through the Bluetooth apparatus "Headset 1".

When the Bluetooth apparatus "Headset 1" is provided as a peripheral Bluetooth apparatus pre-registered in the storage unit 110, the Bluetooth module 134 attempts a connection with the Bluetooth apparatus "Headset 1" without searching the connectable peripheral Bluetooth apparatus. Accordingly, the display 175 may immediately generate words indicating that the Bluetooth module 134 is attempting connection with the Bluetooth apparatus "Headset 1" without having to go through the process of generating the peripheral Bluetooth apparatus list. The display information 340 of FIG. 3D may thus be omitted. When a peripheral Bluetooth apparatus is pre-registered in the storage unit 110, the MP3 player 100 automatically communicates with the pre-registered peripheral Bluetooth apparatus.

Figure 4A:
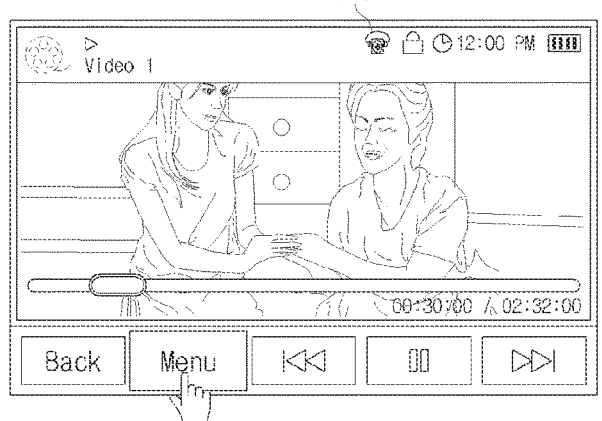
FIGS. 4A, 4B, 4C, 4D, and 4E are views illustrating pop-up window provided by an MP3 player when a Bluetooth mode performing a communication is converted to a basic mode.

FIGS. 4A to 4E show a pop-up window provided by the MP3 player 100 when a Bluetooth mode performing a communication is converted to a basic mode. As shown in FIG. 4A, the user is viewing the video of a replayed file through the display 175, and the audio of the replayed file through a headset of a Bluetooth apparatus. An icon 410 shown in FIG. 4A indicates that the headset of the Bluetooth apparatus is replaying the audio. The user may select menu buttons while the file is being replayed.

Figure 4B:
Figure 4C:
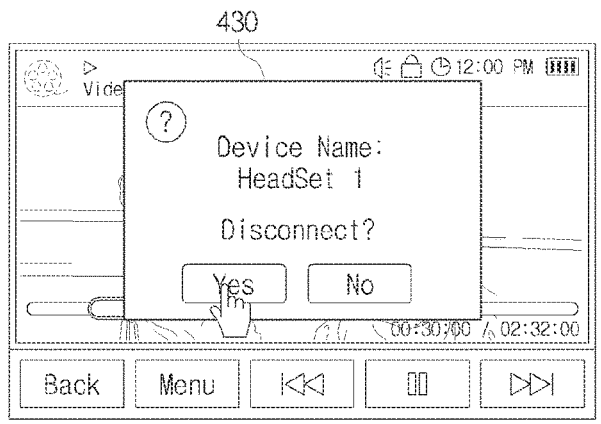

As shown in FIG. 4B, if the user selects the menu button, menus 420 are displayed on an area of the display 175 displaying the replayed video. The menus comprise display information 425 "Disconnect Headset" indicating a basic mode, and the user may select the basic mode. The controller 190 generates display information 430 for recognizing whether to terminate the connection with the Bluetooth apparatus "Headset 1", and transmits the generated display information 430 to the display 175. The display 175 displays the display information 430 in a popup window, as shown in FIG. 4C.

Figure 4D:
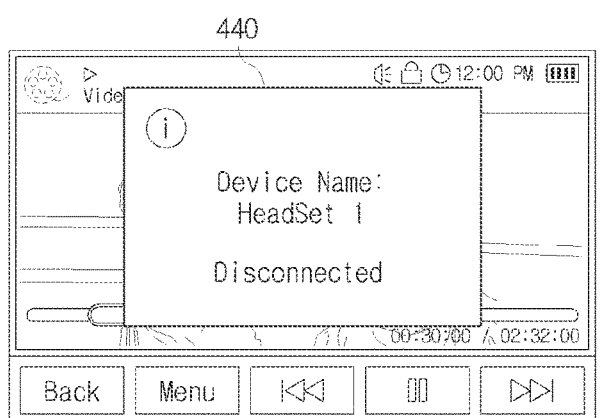
Figure 4E:
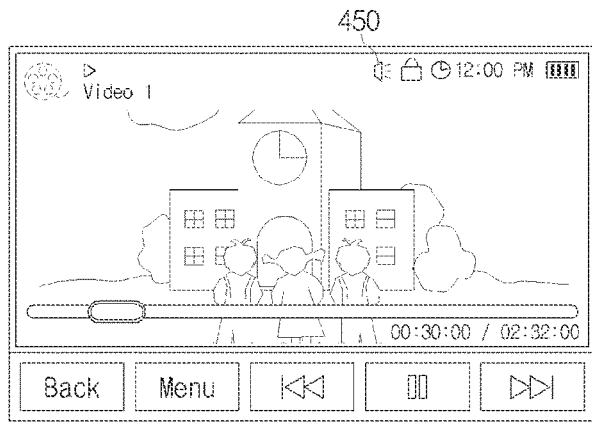

If the user selects item "Yes", the controller 190 transmits to the Bluetooth module 134 a control signal to disconnect data communication from the Bluetooth apparatus "Headset 1". If the Bluetooth module 134 disconnects the data communication from the Bluetooth apparatus "Headset 1", the controller 190 generates display information 440 "Device Name: Headset 1 Disconnected" indicating that the communication between the Bluetooth module 134 and the Bluetooth apparatus "Headset 1" is terminated, and transmits the generated display information 440 to the display 175. The display 175 displays the display information 440 in a popup window as shown in FIG. 4D.

The MP3 player 100 is converted from the Bluetooth mode to the basic mode, and the audio is replayed at the MP3 player independently 100, instead of being replayed through the Bluetooth apparatus "Headset 1". An icon 450 of FIG. 4E indicates that the audio is output through the speaker 160 housed in the MP3 player 100. According to other aspects of the invention, the disconnection can be otherwise achieved, such as without the Yes/No confirmation window of FIG. 4C or the pop-up window of FIG. 4D.

Figure 5A:
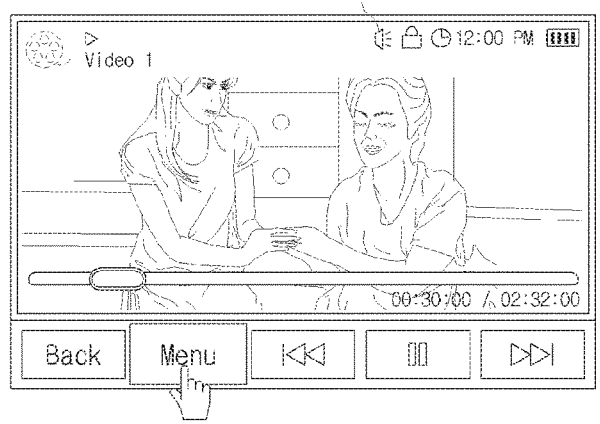
FIGS. 5A, 5B, 5C, 5D, and 5E are views illustrating a pop-up window provided by an MP3 player when a command for converting a basic mode to a Bluetooth mode is input, but the mode conversion is impossible.
Figure 5B:
Figure 5C:
Figure 5D:
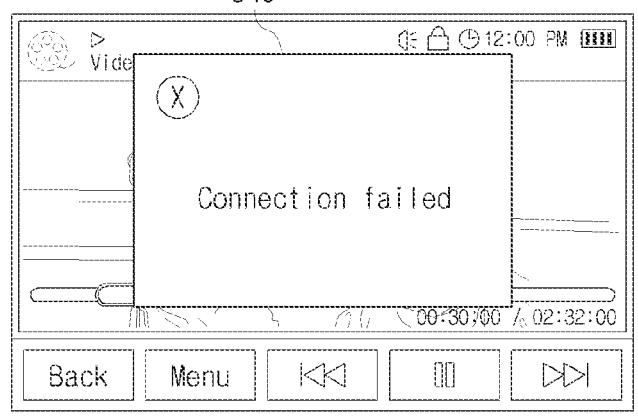

FIGS. 5A to 5E show a pop-up window provided by the MP3 player 100 when a command for converting a basic mode to a Bluetooth mode is input but such mode conversion is impossible. FIGS. 5A and 5B are same as FIGS. 3A and 3B. If a user selects a Bluetooth mode 520, and peripheral Bluetooth apparatuses are pre-registered in the storage unit 110, the controller 190 controls the Bluetooth module 134 to connect with the pre-registered peripheral Bluetooth apparatus. While the Bluetooth module 134 attempts to connect with the pre-registered peripheral Bluetooth apparatus, the controller 190 generates display information 530 "Device Name: Headset 1 Connecting" indicating the Bluetooth module 134 is attempting to connect with the pre-registered peripheral Bluetooth apparatus, and transmits the generated display information 530 to the display 175. The display 175 displays the display information 530 in a popup window shown in FIG. 5C.

If it is impossible for the Bluetooth module 134 to be connected with the Bluetooth apparatus "Headset 1" for some reason, the Bluetooth module 134 transmits the result to the controller 190. The controller 190 generates display information 540 "Connection failed" indicating that the Bluetooth module 134 is not connected with the Bluetooth apparatus "Headset 1", and transmits the generated display information 540 to the display 175. The display 175 displays the display information 530 in a popup window.

Figure 5E:
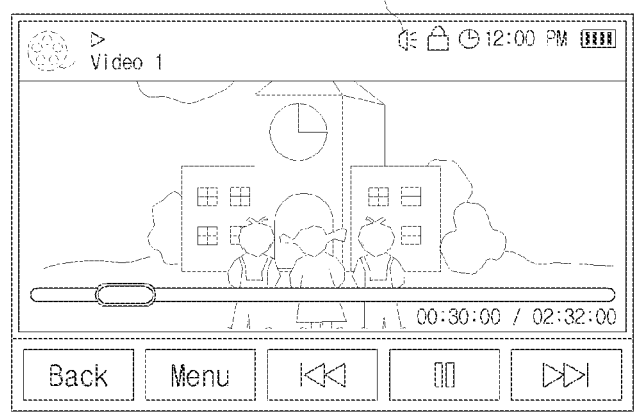

The controller 190 controls various function blocks so that a file is continuously replayed at the MP3 player 100. As shown in FIG. 5E, the video following the video of FIG. 5A is displayed on the display 175, and the audio is output still through the speaker 160.

While the headset is described above as a peripheral Bluetooth apparatus, this should not be considered limiting. The peripheral Bluetooth apparatus may be any apparatus having the Bluetooth module 134, such as mobile apparatus or multimedia replaying apparatus to replay video or audio. If the MP3 player 100 performs data communication with other multimedia replaying apparatuses such as headset profile, hands-free profile, and file transfer protocol (FTP) capable of replaying video and audio, the multimedia replaying apparatus may replay multimedia content transmitted from the MP3 player 100.

When the audio is transmitted to the peripheral Bluetooth apparatus as described above, the MP3 player does not replay the audio. However, this is merely for user convenience. Alternatively, it is possible to transmit the file to the peripheral Bluetooth apparatus, and for the MP3 player to replay the file being transmitted.

While an audio is transmitted to peripheral Bluetooth apparatuses, this should not be considered limiting. Both audio and video, or only video may be transmitted to peripheral Bluetooth apparatuses.

If a command for displaying content menus is input while the multimedia content is replaying only the audio, the content menus may be displayed on a display of a multimedia replaying apparatus.

According to some aspects of the present invention, if the mode of the MP3 player is converted into the Bluetooth mode, the MP3 player replays the video following the replayed video, and the peripheral Bluetooth apparatus also replays the audio following the replayed audio. However, this should not be considered limiting. Even when the MP3 player replays the video and audio following the replayed video and audio, the packet transmitted to the peripheral Bluetooth apparatus may be the whole of the file being replayed, and the whole of the file may be replayed from the beginning at the peripheral Bluetooth apparatus as occasion demands. The peripheral Bluetooth apparatus may store the file without replaying the file. Accordingly, the file may be replayed only when a user inputs a command for replaying the file.

While the MP3 player 100 is described above as the multimedia replaying apparatus, this should not be considered limiting. Aspects of the present invention are applicable to various apparatuses, such as a mobile phone, a personal digital assistant (PDA), and an audio system which may replay video or audio, and the apparatuses may communicate wirelessly with external apparatuses. Additional aspects of the invention can be utilized in portable and non-portable computers.

According to some aspects of the present invention, when a multimedia replaying apparatus communicates with a peripheral apparatus, the communication is limited to the Bluetooth communication. However, in other aspects, the communication is applicable to other wireless communication standards including short range wireless communication. Moreover, while described as switching to a headset, the video and/or audio can also be switched to an external display, such as when the content is to be viewed on a television.

According to aspects of the present invention, a part or the whole of multimedia contents being replayed is readily transmitted to an external apparatus, so that user convenience is improved.

In addition, aspects of the present invention can also be embodied as computer readable codes on a computer readable recording medium. The computer readable recording medium is any data storage device that can store data which can be thereafter read by a computer system. Examples of the computer readable recording medium also include read-only memory (ROM), random-access memory (RAM), CD-ROMs, magnetic tapes, floppy disks, optical data storage devices, Blu-ray discs, and DVDs. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A control method of an electronic device comprising:
playing content;
outputting an audio of the content using a speaker of the electronic device;
in response to a first user input being received while playing the content and outputting the audio of the content using the speaker, displaying a list including one or more electronic devices which are able to output the audio of the content; and
in response to a second user input to select a wireless headset from the list being received, stopping the output of the audio by the speaker and transmitting a packet of an audio corresponding to time after the second user input is received from among the audio of the content, to the selected wireless headset.

2. The method according to claim 1, further comprising:
searching for wireless headsets connectable with the electronic device by wireless communication.

3. The method according to claim 2, further comprising:
registering information of the selected wireless headset in response to the second user input being received.

4. The method according to claim 1, wherein the content comprises at least one of an audio content or a video content.

5. An electronic device comprising:
a speaker;
a display; and
at least one processor coupled to the speaker and the display,
wherein the at least one processor is configured to:
control the speaker to output an audio of content, if the content is played,
in response to a first user input being received while playing the content and outputting the audio of the content using the speaker, control the display to display a list including one or more wireless headset which is able to output the audio of the content, and
in response to a second user input to select a wireless headset from the list being received, control the speaker to stop the output of the audio and transmit a packet of an audio corresponding to a time after the second user input is received from among the audio of the content, to the selected wireless headset.

6. The electronic device according to claim 5, wherein, if the wireless headset is not pre-registered at the electronic device, the at least one processor is further configured to search for wireless headsets.

7. The electronic device according to claim 6, wherein, in response to the second user input being received, the at least one processor is further configured to register information of the selected wireless headset.

8. The electronic device according to claim 5, wherein the content comprises at least one of an audio content or a video content.

9. The method according to claim 2, wherein the searching for the wireless headset comprises searching for the wireless headset if a wireless headset is not pre-registered at the electronic device.

10. The method according to claim 2, wherein the wireless communication is Bluetooth method.

11. The method according to claim 1, further comprising:
displaying a content play state and a menu being selectable between a state of outputting the audio of the content through the electronic device and a state of not outputting the audio of the content through the electronic device.

12. The method according to claim 11, further comprising displaying the list if the menu is selected.

13. The electronic device according to claim 5, further comprising:
an interface configured to search wireless headsets connectable with the electronic device by wireless communication.

14. The electronic device according to claim 13, wherein the wireless communication is Bluetooth method.

15. The electronic device according to claim 5, wherein the at least one processor is configured to control the display to display a content play state and a menu being selectable between a state of outputting the audio of the content through the electronic device and a state of not outputting the audio of the content through the electronic device.

16. The electronic device according to claim 15, wherein the at least one processor is further configured to control the display to display the list if-in response to the menu being selected.

* * * * *